US008116278B2

(12) United States Patent
Green

(10) Patent No.: US 8,116,278 B2
(45) Date of Patent: Feb. 14, 2012

(54) SPECTRUM SHARING BETWEEN OFDM AND NON-OFDM RADIOS

(75) Inventor: Marilynn P. Green, Coppell, TX (US)

(73) Assignee: Nokia Siemens Networks Oy, Espoo (FI)

( * ) Notice: Subject to any disclaimer, the term of this patent is extended or adjusted under 35 U.S.C. 154(b) by 752 days.

(21) Appl. No.: 12/229,079

(22) Filed: Aug. 20, 2008

(65) Prior Publication Data

US 2010/0046463 A1    Feb. 25, 2010

(51) Int. Cl.
*H04W 4/00* (2009.01)
(52) U.S. Cl. ...................................................... 370/330
(58) Field of Classification Search .................. 370/330, 370/335, 342
See application file for complete search history.

(56) References Cited

U.S. PATENT DOCUMENTS

| 7,099,299 B2* | 8/2006 | Liang et al. ............... 370/342 |
| 7,430,257 B1* | 9/2008 | Shattil ....................... 375/347 |
| 7,652,979 B2* | 1/2010 | Arslan et al. ............... 370/208 |
| 7,706,465 B2* | 4/2010 | Gorday et al. .............. 375/295 |
| 2006/0146949 A1* | 7/2006 | Bykovnikov ................ 375/260 |

OTHER PUBLICATIONS

"Cognitive Radio: Making Software Radios More Personal", Joseph Mitola III and Gerald Q. Maguire, Jr., IEEE Personal Communications, Aug. 1999, pp. 13-18.

* cited by examiner

*Primary Examiner* — Derrick Ferris
*Assistant Examiner* — Mohammad Anwar
(74) *Attorney, Agent, or Firm* — Harrington & Smith

(57) ABSTRACT

A signal is generated in the time domain (e.g., GSM, CDMA waveform), digitally sampled at a rate N per symbol interval T over an observation window of length JT to achieve a vector of JN samples. The JN samples are transformed via a DFT of size JN to the frequency domain, where they are mapped using the DFT coefficients to subcarriers of an OFDM or SC-FDMA waveform. Then an IDFT is executed to convert the samples back to the time domain, which are then transmitted on the mapped subcarriers. For the case of a portable device cognitive radio, subcarriers other than the JN subcarriers may be used for pilots or zero weights may be applied to them. For the case of a network node, pilots or samples for other users may be mapped to the other subcarriers, in which case the IDFT is size M>JN for transforming all the user signals.

12 Claims, 4 Drawing Sheets

SPECTRUM SHARING BETWEEN OFDM AND NON-OFDM RADIOS

TECHNICAL FIELD

The teachings herein relate generally to wireless communications, and are particularly related to communications between non-OFDM radios and OFDM radios such as may be necessary for non-OFDM radios to access cognitive systems where OFDM is used for communications that use opportunistically available spectrum.

BACKGROUND

Following are acronyms used in the below description:
BPSK binary phase shift keying
CDMA code division multiple access
CPM continuous phase modulation
DFT discrete Fourier transforms
E-UTRAN evolved UTRAN
GSM global system for mobile communications
IDFT inverse discrete Fourier transform
OFDM orthogonal frequency division multiplexing
OFDMA orthogonal frequency division multiple access
SC-FDMA single-carrier frequency division multiple access
UTRAN universal mobile telecommunications system terrestrial radio access network
WiMAX worldwide interoperability for microwave access Cognitive radios use the radio spectrum in an opportunistic manner by avoiding interfering with primary users such as those operating normally using a GSM, UTRAN, or other more formalized communications protocol. Typically such formalized protocols entail radio resources being assigned by a centralized entity such as a base station, but cognitive radios are assumed to also avoid interfering with radios operating in systems that use contention-based radio access, such as Bluetooth for example. Development of cognitive radio systems is at an early stage, and some cognitive radio systems under development may have a specific spectrum band allocated and may even have some central node, but in all instances the individual cognitive radios operate using the spectrum opportunistically. There are various proposals for cognitive radio operations, many of which assume that the cognitive radio transmissions will be OFDM based.

More generally, cognitive radio may be considered to be a paradigm for wireless communication in which either a network or a wireless node changes its transmission or reception parameters to communicate efficiently. The objective is to avoid interference with licensed (e.g., GSM, UTRAN, E-UTRAN CDMA) or unlicensed (e.g., Bluetooth) radio spectrum users. The alteration of transmission parameters is based on the active monitoring of several factors in the external and internal radio environment, such as radio frequency spectrum, user behavior and the network state.

One of the earliest introductions to cognitive radio is an article by Joseph Mitola III and Gerald Q. Maguire, Jr [*Cognitive Radio: Making Software Radios More Personal*, IEEE PERSONAL COMMUNICATIONS MAGAZINE, August 1999, pp. 13-18]. Since then there has been a significant research effort within the academic and industrial communities to develop cognitive radio/spectrum sharing techniques that can be applied to future communications networks. Shared spectrum usage is an evolving topic that falls under the broad canopy of cognitive radio. Cognitive radio is an emerging topic which many companies and universities are investigating with a projected timeline of 10-12 years for actual system deployment. These teachings hope to advance that timeline as follows.

A problem is anticipated in that different radios, designed to operate according to different radio standards, may prefer to engage in cognitive radio communications with one another. If one regimen for cognitive radio procedures becomes largely accepted, how will other radios designed for protocols that are not consistent with that accepted procedure operate in the cognitive spectrum sharing mode? Cooperative, interference-free spectrum sharing between radios that are normally designed to operate using different standards (e.g., WiMAX, which is OFDM-based; GSM, which is CPM-based; and CDMA 1x) is seen to be an important aspect to avoid resistance by those with a vested interest in the different standards to agreeing to one specific regimen for cognitive radio. This ability to inter-operate among different radios designed for different systems/protocols is seen as likely to advance the cognitive radio concept more quickly toward widescale implementation.

For example, WiMAX and LTE radios use OFDM while GSM and Bluetooth radios use variants of continuous phase modulation CPM, and CDMA (1x) radios use code division multiple access (CDMA). Their physical layer formats are not compatible with one another and, if allowed to operate over the same band without any modifications, will harmfully interfere with each other. As shown in FIG. 1, when the working bands of different non-cooperative systems overlap as is seen between the CDMA receiver and the GSM transmitter, then the result is co-channel and adjacent channel interference. Co-channel interference may be handled by moving the carriers of the two systems farther apart in order to minimize the portion of the spectrum over which they overlap. However, this solution reduces the spectral efficiency of both systems since portions of the radio spectrum go unused. Adjacent channel interference is typically suppressed by dedicated receiver filtering operations, which can be designed to minimize their impact to bit error rate performance.

The inventor is aware of no other algorithm or invention which facilitates spectrum usage between radios that normally operate over different air interfaces without requiring significant hardware/software changes to the radios. These teachings are directed to facilitating such spectrum sharing, in a manner that does not require significant hardware changes to the devices that communicate using the cooperatively shared spectrum. It will be appreciated from the description below that the invention is not limited to the cognitive environment, and can be used by a radio whose transmissions are sent in an E-UTRAN system for example.

SUMMARY

In accordance with one embodiment of the invention there is a method that includes transforming samples taken from a time domain signal to the frequency domain, assigning the transformed samples to frequency subcarriers and thereafter transforming the samples to the time domain, and transmitting the samples that were transformed to the time domain in the assigned subcarriers.

In accordance with another embodiment of the invention there is an apparatus that includes a discrete Fourier transform block, a subcarrier mapping block, an inverse Fourier transform block, and a transmitter. The discrete Fourier transform block is configured to transform samples taken from a time domain signal to the frequency domain. The subcarrier mapping block is configured to assign the transformed samples to frequency subcarriers. The inverse Fourier transform block is configured to transform the mapped samples to the time domain. The transmitter is configured to transmit the samples that were transformed to the time domain in the assigned subcarriers.

In accordance with another embodiment of the invention there is a memory storing a program of computer-readable instructions, executable by a processor, for performing actions directed to transmitting a signal. In accordance with this aspect of the invention, the action include transforming samples taken from a time domain signal to the frequency domain, assigning the transformed samples to frequency subcarriers and thereafter transforming the samples to the time domain, and transmitting the samples that were transformed to the time domain in the assigned subcarriers.

In accordance with another embodiment of the invention there is an apparatus that includes first processing means such as for example a discrete Fourier transform block), mapping means (such as for example a subcarrier mapping block), second processing means such as for example an inverse Fourier transform block), and sending means (such as for example a transmitter). The first processing means is for transforming samples taken from a time domain signal to the frequency domain. The mapping means is for assigning the transformed samples to frequency subcarriers. The second processing means is for transforming the mapped samples to the time domain. And the sending means is for sending the samples that were transformed to the time domain in the assigned subcarriers.

These and other aspects of the invention are detailed more particularly below.

BRIEF DESCRIPTION OF THE DRAWINGS

The foregoing and other aspects of these teachings are made more evident in the following Detailed Description, when read in conjunction with the attached Drawing Figures.

DETAILED DESCRIPTION

Further to the problem formulated above, embodiments of this invention provide a way for one apparatus to generate a signal according to one radio protocol (e.g., GSM, CDMA), and to transmit that signal as an OFDM signal. Where the apparatus is not made for OFDM communications, prior art GSM/CDMA radios can be adapted to practice according to these teachings without extensive redesign and in some instances simply with software adaptations. For the cognitive spectrum sharing aspects of the invention, it is assumed that a cognitive radio spectrum sharing regimen relies on OFDM transmissions. The receiving radio receives the OFDM signal and decodes it, whether the receiving radio is inherently OFDM or adapted by these teachings to decode the received OFDM signal.

Consistent with the background above, one particularly advantageous aspect of these teachings is the development and advancement of technologies that can enable cooperative spectrum sharing between multiple radios which might normally operate using different physical layer standards (e.g., WiMAX, GSM, CDMA, etc.) without requiring significant hardware changes to those devices. Thus it enables common, interference-free access, over a shared portion of the radio spectrum to terminals that might normally be OFDM-based (e.g., WiMAX, LTE), CPM-based (e.g., GSM, Bluetooth, military systems) and/or CDMA-based (e.g., PCS1900). These three standards are by example and not to be limiting; this inventive concept is not limited to any particular physical layer technique but is broadly applicable to all physical layer options.

In a shared, cooperative network, there is a practical need to enable multiple radios to access a common swath of the radio spectrum (whether licensed or unlicensed) for communication. These teachings provide a mechanism by which to do so, which results in minimal impact (in terms of hardware and software changes) to existing radio transceiver units; which minimizes the impact of multiple access interference to radio performance; and conforms to one preferred etiquette (such as OFDM) for communication in order to allow universal access. Further, issues involved with multi-radio coexistence are addressed by the exemplary embodiments of this invention, which continues to support legacy systems (e.g., WiMAX, LTE, GSM) without major changes to the devices designed for those legacy systems while allowing cross-communication between different radios that normally operate over different systems (e.g., WiMAX, LTE, GSM). Thus, spectrum sharing by different operators is facilitated with minimal impact to system performance. This will offer significant and quantifiable benefits to the radios that operate over the shared spectrum bands.

Figure 1:
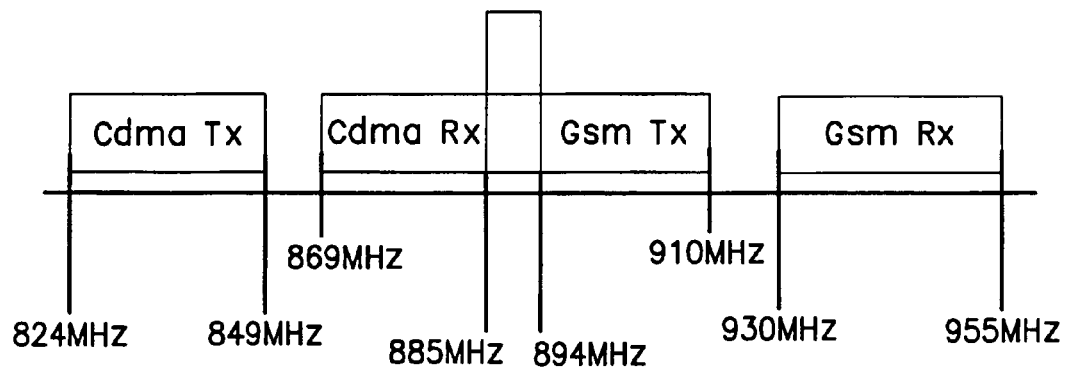
FIG. 1 is a frequency diagram showing working bands of GSM and CDMA 1X systems and illustrating an interference problem for radio inter-operability.
Figure 2:
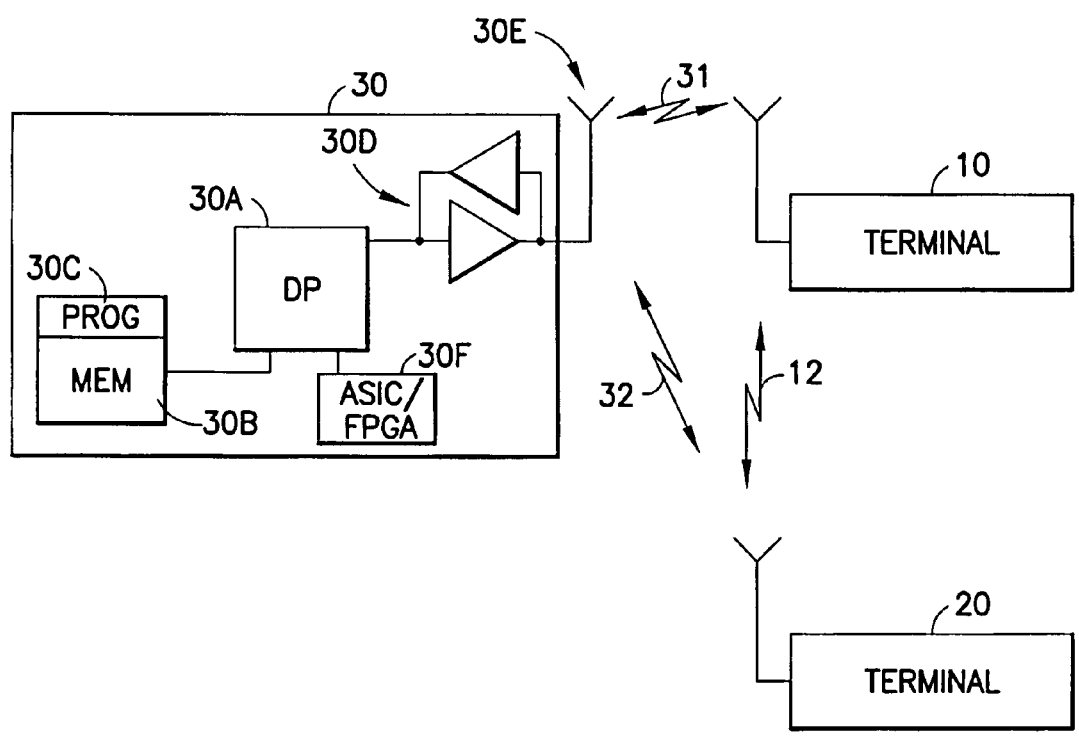
FIG. 2 is a high level schematic block diagram of a cognitive radio terminal in relation to another cognitive terminal and to a network node, all communicating in a cognitive OFDM environment.
Figures 3, 4:
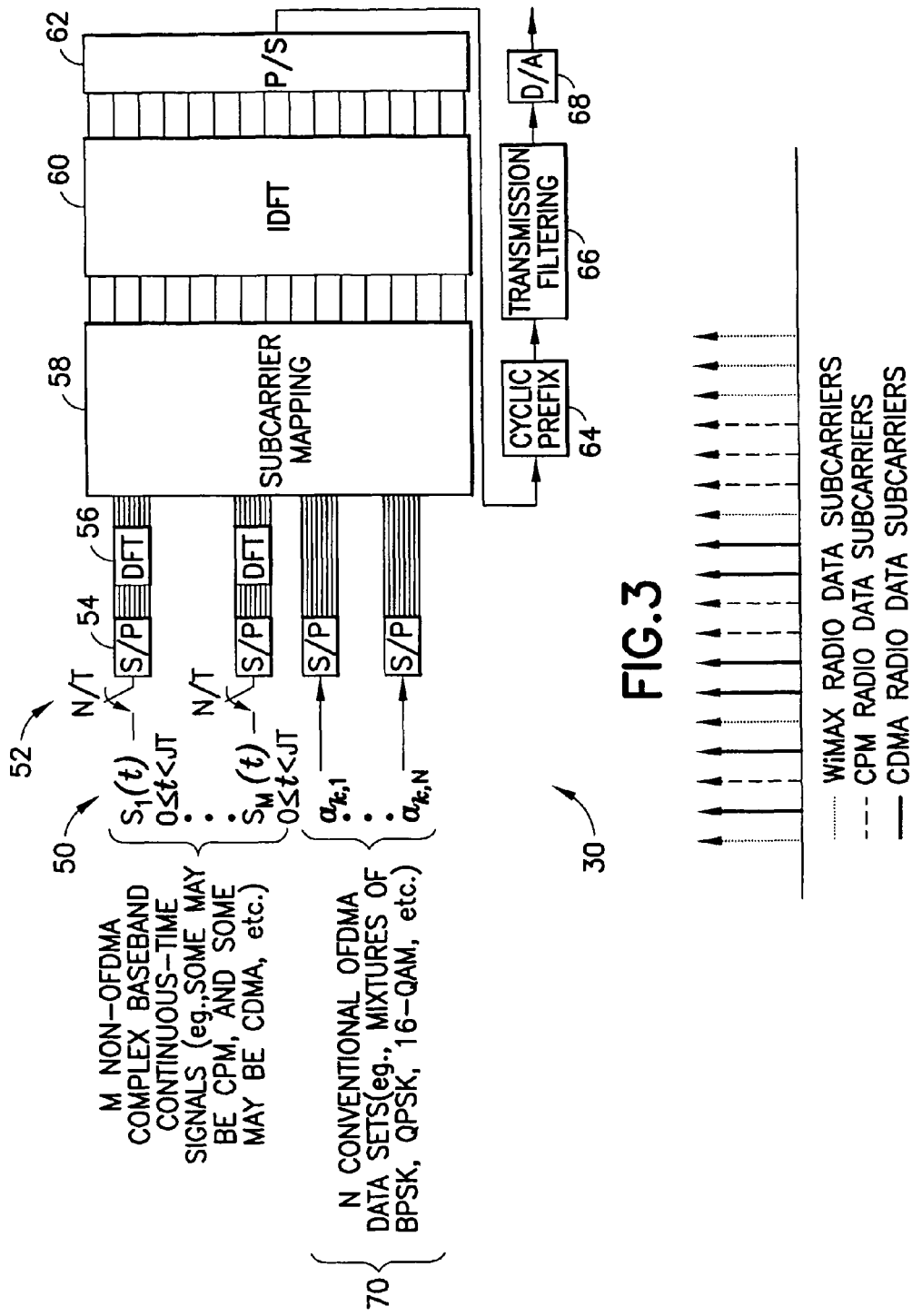
FIG. 3 is a schematic diagram showing relevant portions of a transmitter at a base station/access node using OFDMA-style transmission to communicate with multiple different radio devices, where the base station and at least some of the receiving radio devices operate according to these teachings.
FIG. 4 is a schematic diagram showing spectrum use that is shared between multiple radios operating according to an exemplary embodiment of these teachings.

Consider three cognitive radio terminals at FIG. 2, communication terminal 10, communication terminal 20, and communication node 30 which is shown with high level functional blocks. Node 30 may be a network access node or a portable handheld terminal like the others 10, 20. Terminals 10 or 20 may also communicate according to these teachings with node 30 when that node 30 is embodied as a base station/access node, though their communications in that regard are no different, according to these teachings, than if they were communicating with the other terminal 20, 10. In the example presented herein, these devices 10, 20, 30 illustrate cognitive radios operating on an opportunistic basis and not according to a network protocol that relies on network-dedicated radio resources. While functional blocks are shown for node 30, it will be appreciated the other terminals 10, 20 have similar functional blocks. FIG. 3 gives further detail and distinctions will be made there between implementation for a portable user device and implementation for an access node/base station.

Node 30 includes a data processor (DP) 30A, a memory (MEM) 30B that stores a program (PROG) 30C, and a suitable radio frequency (RF) transceiver 30C coupled to one or more antennas 30D (one shown) for bidirectional wireless communications over one or more wireless links 31, 32 with the other cognitive users 10, 20. Implementation of the invention may be embodied as a software PROG 30C stored in the local MEM 30B of the node 30, or as an ASIC/FPGA 30F coupled to or as a part of the DP 30A. Also shown in FIG. 2 is a link 12 between those other two cognitive terminals 10, 20 to illustrate that cognitive communications need not be limited to only two parties.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The PROG 30C is assumed to include program instructions that, when executed by the DP 30A or ASIC 30F, enable the node 30 to operate in accordance with the exemplary embodiments of this invention, as detailed above. Inherent in the DP 30A is a clock (e.g., oscillator) to enable synchronism among the various apparatus with which it communicates. The PROG 30C may be embodied in software, firmware and/or hardware, as is appropriate. In general, the exemplary embodiments of this invention may be implemented by computer software stored in the MEM 30B and executable by the DP 30A/ASIC 30F of the node 30, or by hardware, or by a combination of software and/or firmware and hardware in the node 30.

In general, the various embodiments of the node 30 as a portable user device can include, but are not limited to, mobile terminals/stations, cellular telephones, personal digital assistants (PDAs) having wireless communication capabilities, portable computers (e.g., laptops) having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions and sensor networks. Embodiments of the node 30 as a network element include a base station, an access node, a NodeB or eNodeB, or the like that serves to allow the portable user terminals access to a wireless network and in many instances from the wireless network to the Internet and/or a publicly switched telephone network.

The MEM 30B may be of any type suitable to the local technical environment and may be implemented using any suitable data storage technology, such as semiconductor-based memory devices, magnetic memory devices and systems, optical memory devices and systems, fixed memory and removable memory. The DP 30A/ASIC 30F may be of any type suitable to the local technical environment, and may include one or more of general purpose computers, special purpose computers, microprocessors, digital signal processors (DSPs) and processors based on a multi-core processor architecture, as non-limiting examples.

The non-limiting example by which the invention is detailed assumes that a shared spectrum network/cognitive radio environment operates as an OFDM-style network. Current OFDM networks typically operate using the principles that support OFDMA or SC-FDMA, and so those specific examples will be employed in this description. However, it is important to note that the invention is not limited to those particular variations of OFDM.

Shared access by radios such as any of terminals 10, 20 or node 30 which do not normally access OFDM style networks is enabled in the following manner. First, the radio constructs the complex baseband equivalent information signal, s(t), according to its normal transmission procedure. Hence, for example, a terminal that normally operates within a GSM network constructs a CPM waveform that modulates the information symbols in a manner that is consistent with GSM standards. Likewise, a terminal that normally operates within a CDMA network constructs a CDMA waveform that modulates the information symbols in a manner that is consistent with CDMA standards.

The complex baseband signal s(t) 50 is observed over JT seconds, where T is the symbol interval. The observed waveform is then sampled at a rate of N times per symbol interval. Hence, given a JT-second window of observation, this sampling operation will yield a signal vector of size JN.

It is assumed that the sampling rate N is adequate to faithfully reconstruct the signal at the receiver (i.e., $N \geq 2$). At this point, the JN samples are fully comparable, from an operational perspective, to the symbols which are assigned to sub-carriers and then transmitted in conventional OFDM systems.

In this manner, the continuous-time signals from non-OFDM terminals are converted to an equivalent vector-space representation. Now, the signal samples, which are fully representative of the underlying waveform, can be transmitted over an OFDM-style network without causing interference to other users.

For the case where the underlying terminal is one that normally accesses OFDM style networks, its procedures remain unchanged. Such a terminal constructs its data symbols as it normally would and then assigns them to the appropriate sub-carrier set over the shared spectrum.

The case where the terminal that normally does not access OFDM style networks is presented at FIG. 3. Assume this is node 30 of FIG. 2, and that it is designed to normally access via a CPM or CDMA (non-OFDM) protocol. The native physical layer communication protocol is not consistent with OFDM. For illustrative purposes, we now consider a protocol wherein spectrum sharing is enabled using OFDMA. While OFDM is used in this example, a similar construction is possible for a SC-FDMA-based system.

Normally, when communicating, node 30 constructs the complex baseband equivalent signal, s(t), which is then possibly filtered, converted to analog and then upconverted to the desired carrier frequency. The functional blocks for this normal processing are shown at the transmission filter 66, digital to analog converter 68, and upconverter (not shown), and can be used for the normal CPM/CDMA signal as well as for the signal processed according to these teachings. When shared spectrum use is available, the node 30 constructs a JT-second segment 50 of the complex baseband equivalent signal, s(t). Note that for a CPM-based radio, s(t) would be a complex baseband CPM waveform. For a CDMA-based radio, s(t) would be a complex baseband CDMA waveform.

Next, the signal s(t) 50 is sampled by a digital sampler 52 at a rate of N times per symbol interval T. This results in the generation of a vector of JN signal samples, $s = [s_0 \ldots s_{JN-1}]^T$ which lie at the serial to parallel converter 54. The waveform, s(t) 50 is presumably sampled at an adequate rate to faithfully represent the waveform over the JT-second observation window. Hence, in most cases N≧2 in order to satisfy Nyquist's criterion for signal reconstruction, guaranteeing that no signal information is lost due to the sampling operation.

In OFDMA, the data symbols are normally constructed directly in the frequency domain. But since node 30 is assumed to be normally non-OFDM, its signals are constructed in the time domain. So Node 30 then transforms the time-domain signal samples, which are contained in the vector s at the serial to parallel converter 54, into the frequency domain using a JN-point discrete Fourier transform DFT shown as the DFT block 56. These DFT coefficients are then assigned to JN distinct sub-carriers at the subcarrier mapping block 58 for transmission over the radio channel.

The above is not to imply that different users (each of which is normally GSM/CDMA or other non-OFDM waveform) use the same sample rate and symbol rate; the symbol interval T and/or the sampling rate N may vary per user, and may even vary among different instances of the same user implementing these teachings. FIG. 3 is merely one exemplary implementation.

Now the frequency domain signal at the subcarrier mapping block is converted back to the time domain at the inverse DFT block 60, serialized at the parallel to serial block 62, and if needed cyclic prefixes are added at the cyclic prefix block 64. The resulting time-domain signal is filtered 66, converted to analog 68, upconverted and transmitted on the OFDM subcarriers.

For the case where the node 30 is a portable user device, transmitting on an uplink to an access node or simply to another user device in direct device to device communications, the user node 30 assigns zeros to the other data subcarriers. If there are pilot subcarriers, the node 30 (whether a portable user device or a network node) assigns non-zero pilot values to the appropriate subcarriers at the subcarrier mapping block 58. The frequency data are then transformed back into the time domain using the IDFT operation and then filtered according to the specified transmission filter. The signal is then further processed, in a standardized manner, for transmission over the radio channel.

For the case where the node 30 is a network node and the transmission takes place over the downlink (i.e., base station or central device transmitting to a multiplicity of radios), a total of JN sub-carriers are assigned to transmit data to one user/radio. The other data sub-carriers are assigned to transmit the signal samples or data of other users, which is shown at reference number 70 of FIG. 3. Pilot symbols are added if needed as is typically the case. For each user, there is a DFT executed on the signal for that user using a DFT sized to that signal. So the signal for the one user is converted to the frequency domain via a JN-point DFT, and signals of other users may or may not be the same size DFT. Regardless of the individual sizes, the multi-user frequency domain signals are converted together back to the time domain via an M-point IDFT (where M>JN and M represents the signals of all the users). Then the entire signal may be upsampled, filtered 66, converted to analog 68 and then transmitted over the air to the multiple end-users.

When the transmitting node 30 is one that normally uses OFDM to transmit (e.g., a WiMAX radio), all core operations remained unchanged. It is possible that the DFT size might differ from the size normally used. However, the generation of data and operations used to convey that data into the time domain are essentially the same as in its native OFDM system.

When the transmitting node 30 normally uses SC-FDMA to transmit (e.g., the uplink of an E-UTRAN system) all core operations remained unchanged. It is possible that the IDFT/DFT size might differ from the size normally used. However, the generation of data and operations used to convey that data into the time domain are essentially the same as in its native OFDM system.

FIG. 4 contains a simple illustrative representation of the concept of spectrum sharing in the OFDM-style network that is exploited by CPM and CDMA radios according to these teachings. While the CPM radio and the CDMA radio send signal samples over their assigned subcarriers, the WiMAX radio sends data symbols over its assigned subcarriers.

Figure 5:
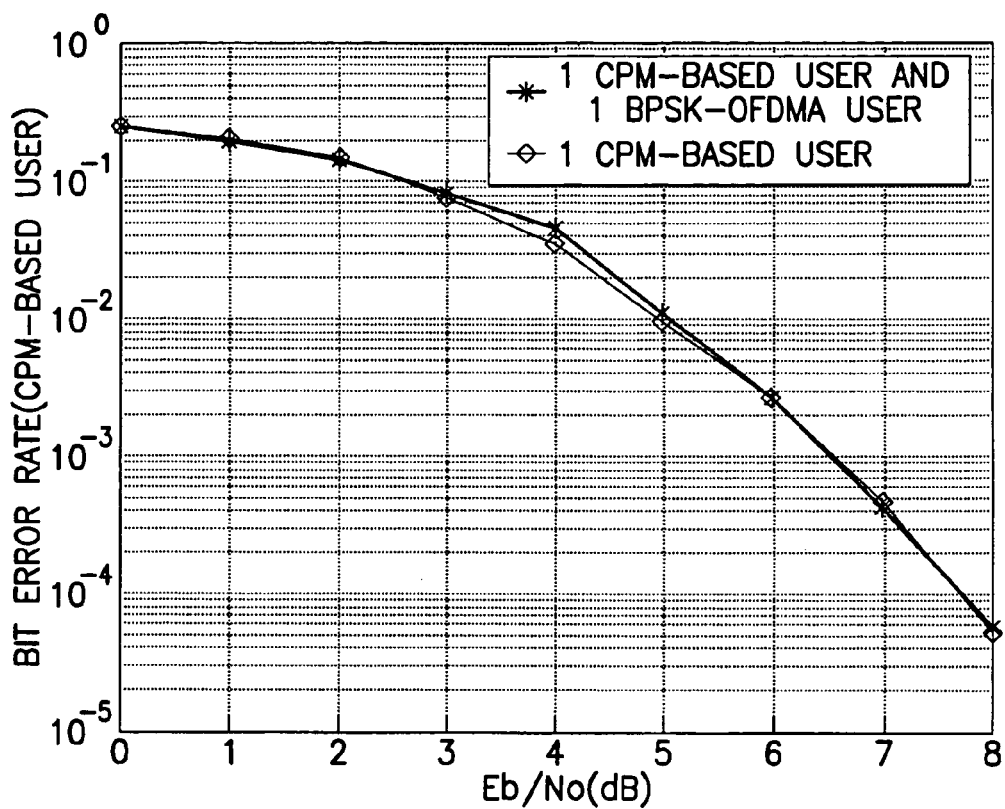
FIG. 5 is a gray-mapped data plot of bit error rate performance of the CPM-based user when there is one co-channel user present (BPSK-OFDMA) and in the absence of any co-channel users, according to an embodiment of the invention.
Figure 6:
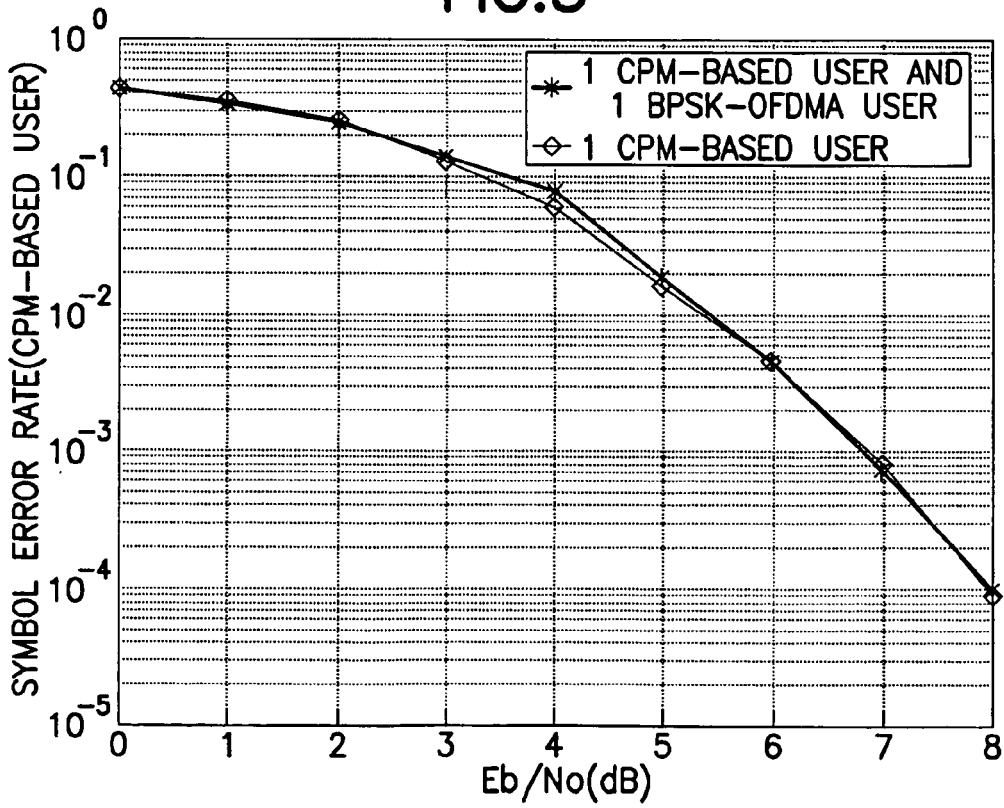
FIG. 6 is similar to FIG. 5 but showing symbol error rate performance.

Presented at FIGS. 5-6 are simulation results which demonstrate co-existence between two users. Both data sets are from the same simulation between two co-channel users, and for the simulation it was assumed that there are no pilot subcarriers.

The first co-channel user normally transmits a CPM signal, which for the signal exhibited the following signal parameters: M=4 (i.e., 2 bits/symbol); raised cosine frequency pulse shaping; signal memory L=2; dual modulation indices h={5/16; 6/16}; gray mapping of the data symbols. This CPM signal was sampled at a rate of 8 times per symbol interval and it sends 256 symbols per data frame. Hence, transmission of this signal in a single data frame requires the use of 2048 data subcarriers. The CPM-based signal was sampled and then transformed into the frequency domain by a 2048-point IDFT.

The second co-channel user normally sends BPSK over an OFDMA system. Hence, the data symbols (+1, −1) are constructed in the frequency domain. The BPSK-OFDMA transmission is normally critically sampled (i.e., 1 sample per symbol interval) in the frequency domain. Assuming that both users are allocated the same number of data subcarriers, the BPSK transmission can send 2048 data symbols using 2048 data subcarriers. Since these data symbols were constructed directly in the frequency domain, they were mapped directly to their subcarriers.

The total number of subcarriers employed in this quantitative simulation is thus equal to 4096. The subcarrier mapping rule was based on a distributed subcarrier mapping, whereby the CPM-based signal occupied all even subcarriers and the BPSK-OFDMA signal occupied all of the odd subcarriers.

The signal-to-interference ratio is 0 dB. FIG. 4 quantifies the bit error rate performance of the first co-channel user as a function of signal-to-noise energy (Eb/No) and as a function of the number of co-channel users. FIG. 5 quantifies the symbol error rate under the same conditions. Clearly, as these results show, the receiver performance is unaffected by the presence of the second co-channel user. This example serves to clearly illustrate the robust nature of this system, which is supporting a CPM-based and a BPSK-OFDMA-based transmission over a shared portion of the radio spectrum, without requiring the use of interference cancellation techniques at either receiver. This example serves to illustrate that this invention represents a significant advancement in the state of the art toward the development of spectrum sharing techniques for cognitive radio.

Figure 7:
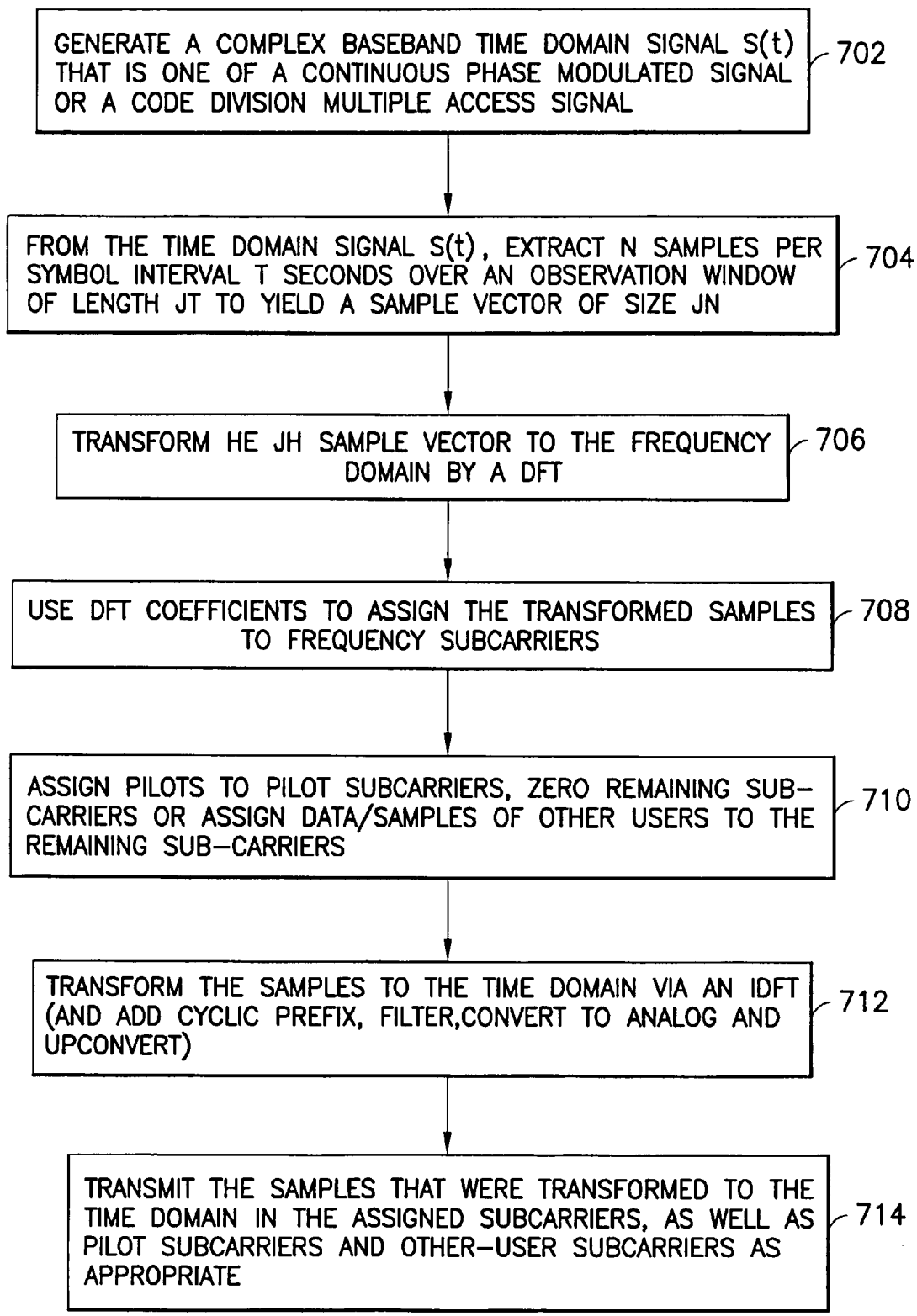
FIG. 7 is a process flow diagram showing process steps according to an exemplary embodiment of the invention.

FIG. 7 shows a process flow diagram from the perspective of the node 30 according to an exemplary embodiment of the invention. At block 702 a complex baseband time domain signal s(t) is generated that is one of a continuous phase modulated signal or a code division multiple access signal. At block 704 there are extracted from the time domain signal s(t) N samples per symbol interval T seconds over an observation window of length JT to yield a signal vector/sample block of size JN, which are transformed at block 706 to the frequency domain by a DFT. At block 708 the DFT coefficients are used to assign the transformed samples to frequency subcarriers. At block 710, pilot symbols (if any) are assigned to pilot subcarriers, for the case of a user equipment the remaining sub-carriers are zeroed or for the case of a network element and downlink transmissions the data/samples of other users are assigned to the remaining sub-carriers. At block 712 the samples are transformed back to the time domain via an IDFT. Other normal processing such as adding cyclic prefix, filtering, converting to analog and upconverting are also done at this stage. Finally at block 714 the samples that were transformed to the time domain are transmitted in the assigned subcarriers, as well as pilot subcarriers and other-user subcarriers as appropriate from the previous blocks.

As can be seen from the above description, embodiments of this invention provide an ability for terminals which normally operate using different air interfaces and standards to access a common, shared bandwidth using an orthogonal set of sub-carriers. Consequently, in the ideal case, there is no multiple access interference between the transmissions from different users. This offers a distinctive advantage over shared access systems wherein the users transmit different waveform types and where interference cancellation is required in order to maintain a desired error rate performance.

Additionally, the receiver can implement the low-complexity equalization algorithms commonly used in OFDM in order to combat frequency selective fading and other channel impairments. This might constitute a significant advantage to certain users. For example, in CPM, channel equalization is known to be difficult since the CPM signal memory and the radio channel memory must both be taken into account in designing the equalizer, and the complexity of the equalizer increases exponentially with overall memory (channel +signal). After possible correction for frequency selective fading, the receiver now operates on a noisy version of the transmitted signal samples. This implies that the receiver can use the algorithms typically implemented to detect the transmitted symbols. This feature offers a distinctive advantage if two radios that normally operate over a particular air interface (e.g., GSM) can communicate over the shared spectrum with less interference because the receiving radio device can implement the same suite of detection algorithms as it normally would. For example, for a GSM-based terminal, once the frequency domain equalization is complete, the receiver can perform symbol detection by operating on the (noisy) signal samples in a maximum likelihood sequence detection algorithm, just as it does in a conventional GSM network. This implies that all of the legacy receiver algorithms can be re-used when the two terminals operate over this shared spectrum system.

A further advantage is that embodiments of this invention enables terminals that normally use a different interface to communicate using a common air interface, which is built upon the popular OFDM framework. Such embodiments further strengthens the advances OFDM as a 'backbone' technology of the future, by showing that it can be used to provide a common air interface for non-OFDM-based technologies as well. The described embodiments cause minimal impact to the transmitter and the receiver front end, which in the typical instance will requires inclusion of DFT/IDFT modules and some software upgrades. For an OFDM-based terminal, there are no significant changes to its mode of operation at the transmitter or receiver.

In general, the various embodiments may be implemented in hardware or special purpose circuits, software (computer readable instructions embodied on a computer readable medium), logic or any combination thereof. For example, some aspects such as the sequence generator may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation such as FIG. 7, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits ICs is by and large a highly automated process. Complex and powerful software tools are available for converting a logic level design into a semiconductor circuit design ready to be etched and formed on a semiconductor substrate. FIG. 7 may represent specific functional circuits of such an IC.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

I claim:

1. A method executed by a network access device comprising:
    transforming samples taken from a time domain signal to a frequency domain by a discrete Fourier transform;
    assigning the transformed samples to frequency subcarriers and thereafter transforming the samples to the time domain; and
    transmitting the samples that were transformed to the time domain in the assigned subcarriers;
    wherein:
    assigning the samples to the frequency subcarriers comprises assigning coefficients of the discrete Fourier transform to the sub-carriers which are orthogonal frequency division multiple access subcarriers on which the samples are transmitted;
    the samples taken from the time domain signal comprise N samples per symbol interval T seconds over an observation window of length JT that are represented as a sample vector of size JN on which the discrete Fourier transform is executed, where N and J are each positive integers greater than one and the coefficients are assigned to JN distinct subcarriers; and the transmitting comprises transmitting the samples in the JN distinct subcarriers to a first portable device operating in a cognitive radio environment and transmitting one of further samples or data to at least one other portable radio device in subcarriers other than the JN distinct subcarriers;

the method further comprising, after assigning the coefficients, adding pilot symbols, converting the pilot symbols and the sample vector of size JN and the further samples or data to the time domain using an M-point inverse discrete Fourier transform, thereafter converting to analog, in which the transmitting comprises transmitting the analog signal over M subcarriers, wherein M is greater than JN.

2. The method of claim 1, further comprising:
generating the time domain signal from which the samples are taken as a complex baseband signal that is one of a continuous phase modulated signal or a code division multiple access signal.

3. The method of claim 1, wherein transmitting comprises assigning non-zero weights to pilot subcarriers other than the JN distinct subcarriers.

4. The method of claim 1, wherein transmitting comprises assigning zero weights to all other subcarriers that are not among the JN distinct subcarriers and not among pilot subcarriers.

5. An apparatus comprising a network access device which comprises:
a discrete Fourier transform block configured to transform samples taken from a time domain signal to a frequency domain by a discrete Fourier transform;
a subcarrier mapping block configured to assign the transformed samples to frequency subcarriers;
an inverse Fourier transform block configured to transform the mapped samples to the time domain; and
a transmitter configured to transmit the samples that were transformed to the time domain in the assigned subcarriers;
wherein:
the subcarrier mapping block is configured to assign the transformed samples to the frequency subcarriers using coefficients generated by the discrete Fourier transform block;
the apparatus further comprises a sampler configured to sample the time domain signal at a rate of N samples per symbol interval T seconds over an observation window of length JT that are represented as a sample vector of size JN that is input to the discrete Fourier transform block, where N and J are each positive integers greater than one and the coefficients are assigned to JN distinct subcarriers;
the apparatus comprises a network access device and the transmitter is configured to opportunistically transmit the samples that were transformed to the time domain in the JN distinct subcarriers to a first portable device operating in a cognitive radio environment and to transmit one of further samples or data to at least one other portable radio device in subcarriers other than the JN distinct subcarriers; and
the inverse Fourier transform block is further configured to transform pilot symbols and the sample vector of size JN and the further samples or data to the time domain using an M-point inverse discrete Fourier transform, and wherein the transmitter is configured to transmit the signal over M subcarriers, wherein M is greater than JN.

6. The apparatus of claim 5, further comprising:
a processor configured to generate the time domain signal as a complex baseband signal that is one of a continuous phase modulated signal or a code division multiple access signal.

7. The apparatus of claim 5, wherein the subcarrier mapping block is further configured to assign non-zero weights to pilot subcarriers other than the JN distinct subcarriers.

8. The apparatus of claim 5, wherein the subcarrier mapping block is further configured to assign zero weights to all other subcarriers that are not among the JN distinct subcarriers and not among pilot sub-carriers.

9. A memory storing a program of non-transitory computer-readable instructions executable by a processor for performing actions directed to transmitting a signal, the actions comprising:
transforming samples taken from a time domain signal to a frequency domain;
assigning the transformed samples to frequency subcarriers and thereafter transforming the samples to the time domain; and
transmitting the samples that were transformed to the time domain in the assigned subcarriers;
wherein:
assigning the samples to the frequency subcarriers comprises assigning coefficients of the discrete Fourier transform to the sub-carriers which are orthogonal frequency division multiple access subcarriers on which the samples are transmitted;
the samples taken from the time domain signal comprise N samples per symbol interval T seconds over an observation window of length JT that are represented as a sample vector of size JN on which the discrete Fourier transform is executed, where N and J are each positive integers greater than one and the coefficients are assigned to JN distinct subcarriers; and
the transmitting comprises transmitting the samples in the JN distinct subcarriers to a first portable device operating in a cognitive radio environment and transmitting one of further samples or data to at least one other portable radio device in subcarriers other than the JN distinct subcarriers;
the actions further comprising, after assigning the coefficients, adding pilot symbols, converting the pilot symbols and the sample vector of size JN and the further samples or data to the time domain using an M-point inverse discrete Fourier transform, thereafter converting to analog, in which the transmitting comprises transmitting the analog signal over M subcarriers, wherein M is greater than JN.

10. The memory storing the program of non-transitory computer-readable instructions according to claim 9, the actions further comprising:
generating the time domain signal from which the samples are taken as a complex baseband signal that is one of a continuous phase modulated signal or a code division multiple access signal.

11. An apparatus comprising:
first processing means for transforming samples taken from a time domain signal to a frequency domain by a discrete Fourier transform;
mapping means for assigning the transformed samples to frequency subcarriers;
second processing means for transforming the mapped samples to the time domain; and
sending means for sending the samples that were transformed to the time domain in the assigned subcarriers;

wherein:
the mapping means is for assigning to assign the transformed samples to the frequency subcarriers using coefficients generated by the discrete Fourier transform block;
the apparatus further comprises a sampler configured to sample the time domain signal at a rate of N samples per symbol interval T seconds over an observation window of length JT that are represented as a sample vector of size JN that is input to the discrete Fourier transform block, where N and J are each positive integers greater than one and the coefficients are assigned to JN distinct subcarriers;
the apparatus comprises a network access device and the sending means is for opportunistically transmitting the samples that were transformed to the time domain in the JN distinct subcarriers to a first portable device operating in a cognitive radio environment and to transmit one of further samples or data to at least one other portable radio device in subcarriers other than the JN distinct subcarriers; and
the second processing means is further for transforming pilot symbols and the sample vector of size JN and the further samples or data to the time domain using an M-point inverse discrete Fourier transform, and wherein the sending means is for transmitting the signal over M subcarriers, wherein M is greater than JN.

12. The apparatus of claim 11, wherein:
the first processing means comprises a discrete Fourier transform block;
the mapping means comprises a subcarrier mapping block;
the second processing means comprises an inverse discrete Fourier transform block; and
the sending means comprises a transmitter.

* * * * *